March 14, 1961 C. E. SCHROEDER ET AL 2,975,307
CAPACITIVE PRIME MOVER
Filed Jan. 2, 1958 3 Sheets-Sheet 1

INVENTORS
CHARLES E. SCHROEDER
HERBERT P. BYRNES
BY
ATTORNEY

March 14, 1961  C. E. SCHROEDER ET AL  2,975,307
CAPACITIVE PRIME MOVER

Filed Jan. 2, 1958  3 Sheets-Sheet 2

March 14, 1961  C. E. SCHROEDER ET AL  2,975,307
CAPACITIVE PRIME MOVER

Filed Jan. 2, 1958

United States Patent Office 2,975,307
Patented Mar. 14, 1961

2,975,307

CAPACITIVE PRIME MOVER

Charles E. Schroeder, Garrison, and Herbert P. Byrnes, Poughkeepsie, N.Y., assignors to International Business Machines Corporation, New York, N.Y., a corporation of New York Filed Jan. 2, 1958, Ser. No. 706,805

6 Claims. (Cl. 310—6)

This invention relates to a prime mover and more particularly to one in which the attraction of the plates of a capacitor is used to effect a drive.

It is a proven fact that when a difference in potential is applied between wires or plates in proximity to each other electrostatic action will cause them to be attracted toward one another.

It is a principal object of this invention to provide a prime mover in which the cumulative electrostatic action of a plurality of plates stacked together in spaced relation will function as a driving means.

Another object is to provide a method of assembling a low voltage, low amperage prime mover for actuating circuit components, such as relays, potentiometers and the like.

Other objects of the invention will be pointed out in the following description and claims and illustrated in the accompanying drawings, which disclose, by way of example, the principle of the invention and the best mode which has been contemplated of applying that principle.

As mentioned above the invention uses the principle that adjacent plates or wires will be attracted to each other when connected, one to the positive side of the voltage source and the other to the negative. This is due to the fact that the positive and negative charges attract one another. The force action in this capacitor acts according to Coulomb's law, i.e., the forces are proportional to the product of the charges and inversely proportional to the square of the distance between them.

Figure 1:
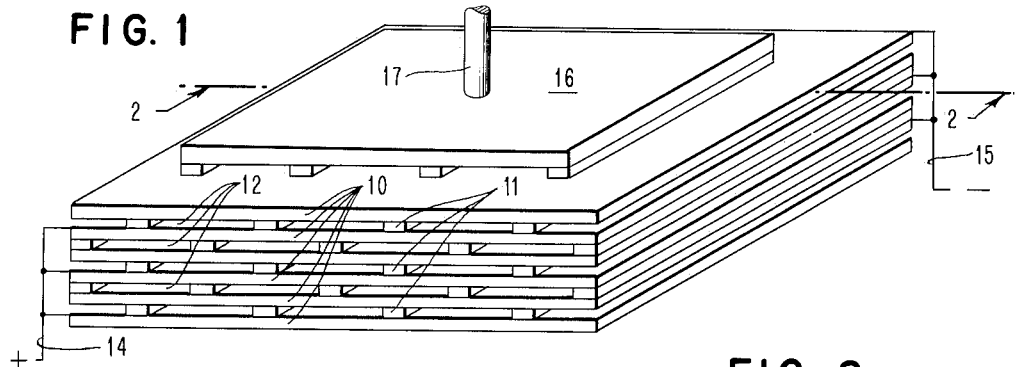
Fig. 1 shows a plurality of plates stacked to form a prime mover.

To illustrate the invention a prime mover unit is shown in Fig. 1. Here mounted on a base plate (not shown), are a plurality of plates 10 of dielectric such as rubber, glass, ceramics or a plastic. The plates 10 are sprayed or coated in any well known manner with finely divided zinc, tin, aluminum or other metal having good conductive qualities. The plates 10 are held apart by staggered separators 11 forming spaces 12 into which the plates can be deflected when potentials of different polarities are applied to the leads 14 and 15. The leads 14 and 15 are connected as shown to alternate plates thus forming a plurality of two plate condensers stacked one on the other. Secured to the top plate 10 by any suitable bonding substance, preferably of an insulating nature such as any well known thermostatic, is a stiff plate of metal or any suitable material by which motion and power of the prime mover may be transmitted by any means such as a post 17. The metal along the outer edges of the conducting surface 18 (Fig. 2) of each plate is removed by etching, masking or any other similar means to form a border 19. This is done to prevent edge arcing.

Whereas there are only six plates shown in Fig. 1 it is to be understood that any number of plates may be used and also that as shown they are greatly magnified. In an actual practice of the invention a prime mover was made for actuating a relay similar to Fig. 4 using 500 plates or film made from polyethylene terephthalate known as Mylar (i.e. du Pont de Nemours and Co.) vacuum metalized with aluminum to form a suitable conducting surface approximately .00001 inch thick. The plates were .00025 inch thick and 3 square inches in area. The separators 11 were .0002 inch thick and approximately .0045 inch wide and 1.5 inches long. The distance between separators was approximately .045 inch. The separators were preferably of a thinner plastic such as 3M cement or Mylar which when heated bonded the plates together into a unitary structure.

In assembling the unit the plates were die cut to the required shape and the separators then screen printed in plastic ink on the sheets. The sheets after being stacked with their base plate and a drive plate were heat treated to melt the thermoplastic and so bond the base, drive plate and plates into a unitary structure. It is obvious that the structure of this example formed an extremely small prime mover. It is also obvious, however, that thicker plates and separators may be used to form larger and more powerful units.

Figure 2:
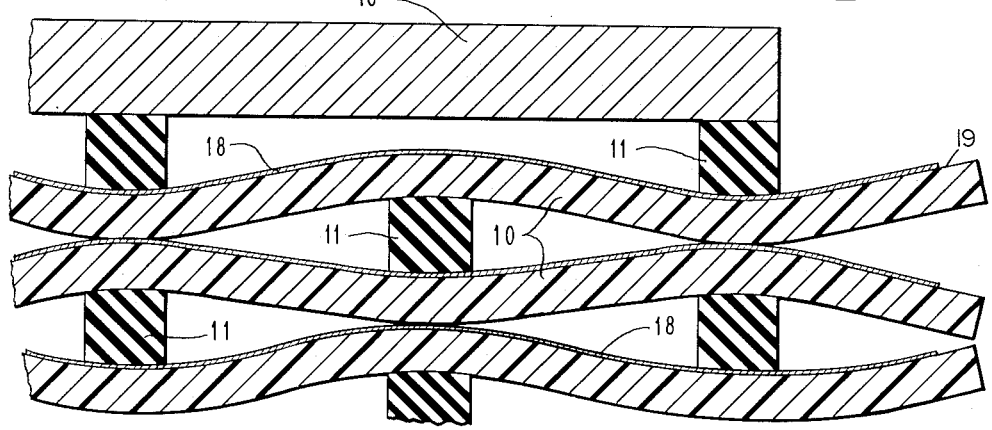
Fig. 2 is a greatly enlarged section of the plates of Fig. 1 in their attracted position.

In Fig. 2 potential has been applied to the plates 10 causing them to be attracted to one another as shown. The separators 11 prevent the complete collapse of the stack and transmit power from one plate to another cumulatively. The metal conducting surface 18 and the border 19 can be seen in this view.

Figure 3:
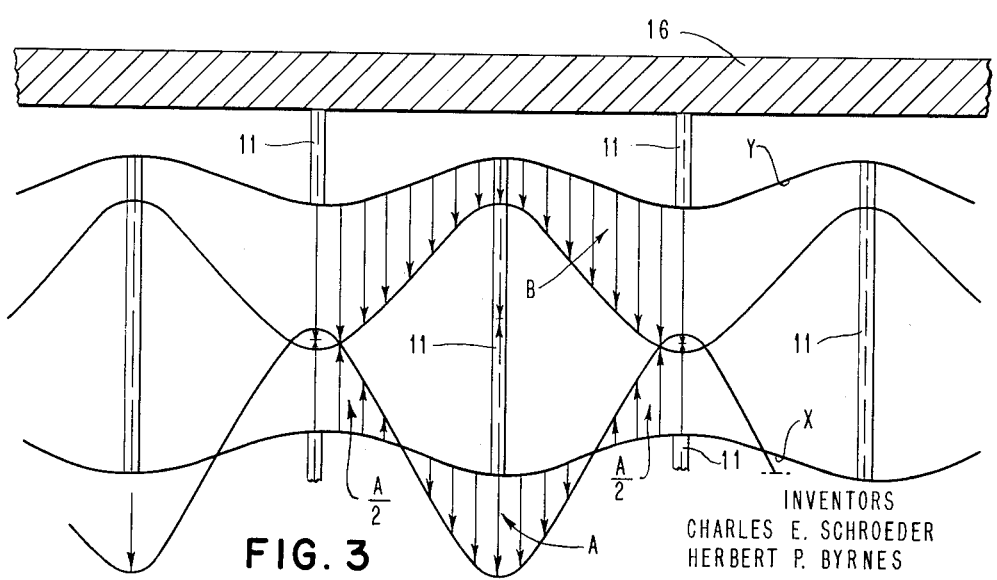
Fig. 3 is a vector diagram showing the forces exerted in the plates when attracted.
Figure 8:
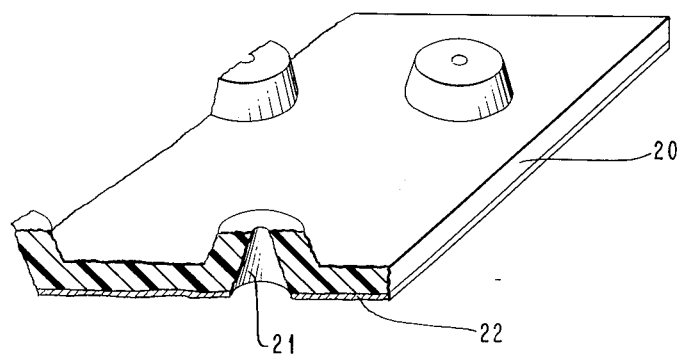
Fig. 8 shows a condenser plate having pimples or extrusions formed thereon.

Fig. 3 is a vector diagram showing the forces acting when the plates are deformed or attracted. A plate X in being deflected is acted upon by all the combined forces $$\frac{A}{2}$$

and all the forces A, each of which will balance out the other and therefore have no effect except deformation of the plate. However all of the vectors B acting on the plate Y which is connected to the drive plate 16 all act to force the plate down thereby drawing the drive plate away from its normal position. An alternate form of plate is shown in Fig. 8, wherein the dielectric portion 20 is composed of a plastic or ceramic having extrusions or pimples 21 formed thereon which act as separators and is plated on its under surface with a sheet of conducting material 22. Forming a plate in this manner permits the stacking of the plates without the necessity of accurately printing or locating individual separators.

Figure 4:
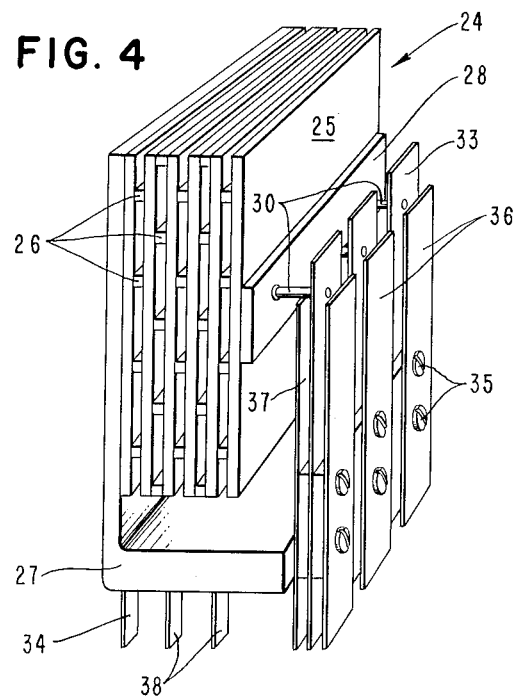
Fig. 4 shows the electrostatic prime mover as used in a multi-contact relay.
Figure 5:
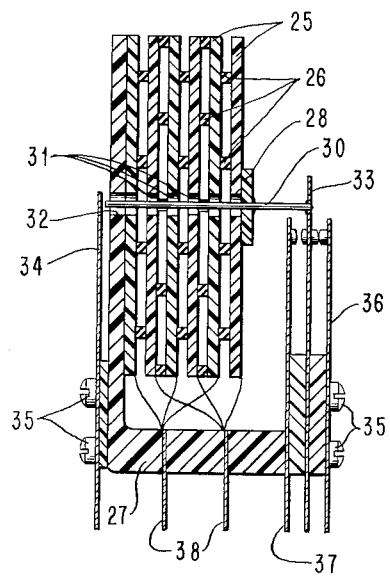
Fig. 5 is a cross section taken through line 5—5 of Fig. 4.

The multi-contact relay 24 shown in Figs. 4 and 5 is powered by a prime mover formed as described above. The stack comprises plates 25 and separators 26 and is bonded to an L shaped frame 27 of dielectric material preferably a molded plastic. Bonded to the outermost plate 25 is a bar 28 also of plastic to which is secured a stiff wire 30 of silver or other contact metal which extends through aligned apertures 31 in the plates 25 and an aperture 32 in the frame member 27. One end of wire 30 is secured to a contact spring 33, while the other end is adapted, when the prime mover is actuated, to make contact with a contact spring 34 secured to the back of the frame 27 by any suitable means such as screws 35. Associated with the contact spring 33 are two additional springs 36 and 37 which form a make break contact pile. Terminals 38 secured in the base preferably by molding provide means for connecting the plates of the stack to a source of potential.

In operation, when a voltage is connected to the terminals 38, the plates 25 are attracted to one another moving bar 28 and wire 30 to the left (Fig. 5) opening contact springs 33 and 36 and closing contacts 33 and 37. At the same time, the wire 30 makes contact with spring 34. It is apparent that the length of wire 30 may be adjusted to permit contacts 33 and 36 to open and contact 34 to be closed before contacts 33 and 37 are made. Also by shortening the wire 30, contacts 33 and 37 can be made before wire 30 will contact spring 34.

Figure 6:
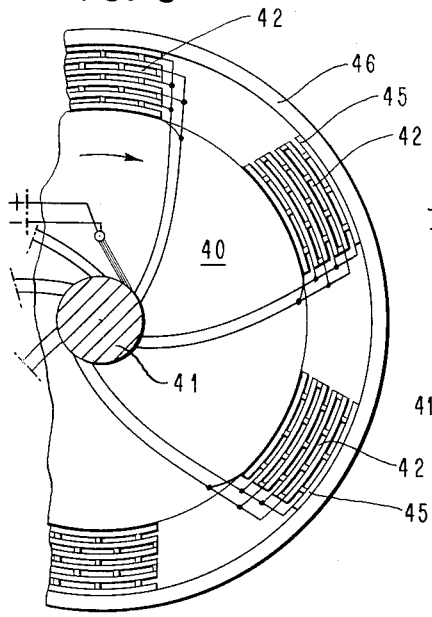
Fig. 6 shows the prime mover used as a clutch.
Figure 7:
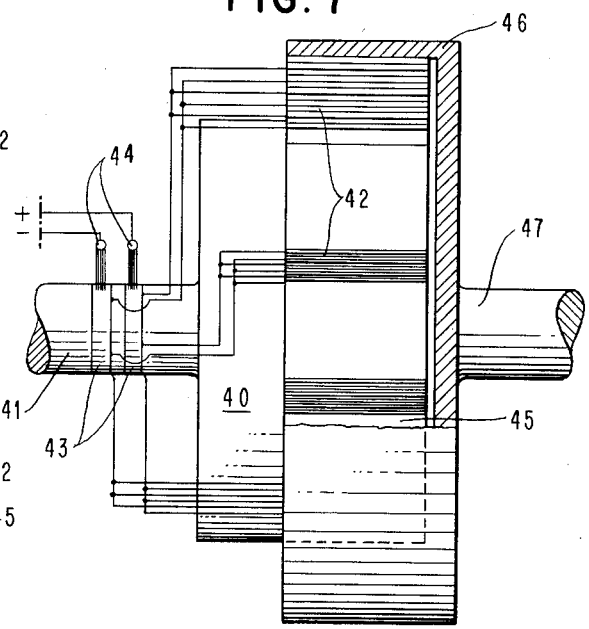
Fig. 7 is a side view of Fig. 6 with a portion of the clutch drum broken away to show the parts.

In Figs. 6 and 7, the prime mover is shown as used in a clutch. A cup shaped member 40 is secured to a driving shaft 41 and has a plurality of prime mover units 42 bonded to the periphery thereof. The leads for actuating the prime movers 42 are brought to commutator rings 43 which are connected to a power source through brushes 44. The outermost plates of each of the prime movers has a friction material 45 bonded thereon. Surrounding and containing the prime movers 42 is a cup shaped member 46 secured to a shaft 47. In assembling this clutch voltage is applied to the prime mover thereby causing the plates 42 to be deflected to such a degree that the cup 40 with its associated prime movers may be inserted in the cup 46.

Upon removal of the voltage from the brushes 44 the prime mover will again resume a normal condition thereby gripping the inner surface of the cup 46 with the friction plates 45 and effecting a driving connection between shafts 41 and 47.

Figure 10:
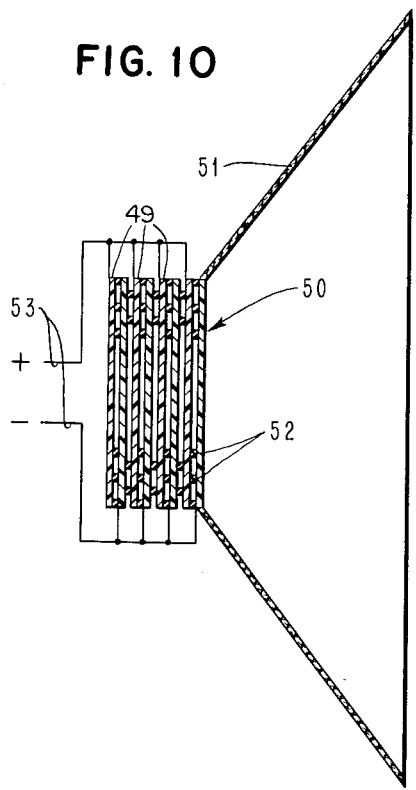
Fig. 10 is a cross section taken along line 10—10 of Fig. 9.
Figure 9:
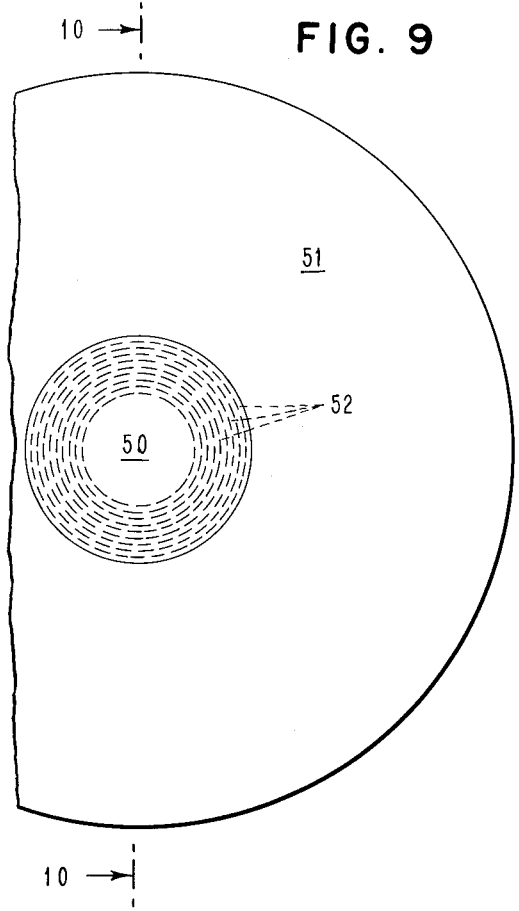
Fig. 9 is a front view of a loud speaker using the invention.

In Figs. 9 and 10 the prime mover is shown as used in a loud speaker. A prime mover 50 is secured to the base of the usual truncated speaker cone 51. The prime mover in this case has disc shaped plates 49 and separators 52 in the form of concentric rings in place of lines or grids. Alternating voltage applied to the leads 53 will oscillate the prime mover thereby oscillating the cone 51 to reproduce sound.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a prime mover, a plurality of conductors each comprising a metallic coating of a dielectric, a plurality of separators, said conductors being stacked with said separators in staggered relation, a pair of power leads, alternate conductors connected to one of said leads, the remaining conductors connected to the other lead, and a source of potential connected to said leads whereby said conductors will be attracted one to another to generate motion and power.

2. In a prime mover, a plurality of plates each comprising a metallic coating on a dielectric, a plurality of separators, said plates being stacked with said separators located in staggered relation, a pair of conductors, alternate plates connected to one of said conductors, the remaining plates connected to the other conductor, and a source of voltage connected to said conductors whereby said plates will be attracted one to another to generate motion and power.

3. In a prime mover a plurality of plates stacked in concentric relation, staggered separators located between said plates, said stack being secured to a base, a driving plate secured to the uppermost plate of said stack, and means for supplying potential to said stack, whereby the electrostatic action between said plates will effect a drive.

4. The method of assembling an electrostatic prime mover comprising the coating of a sheet of dielectric with a conductive material, printing lines of a bonding material on said sheet to form separators, cutting said sheet into concentric plates, stacking said plates and connecting alternate plates to a common bus and the remaining plates to a second common bus.

5. The method of assembling an electrostatic prime mover comprising the coating of a sheet of dielectric with a metallic conductor, photo screen printing lines of thermo setting material on said conductor to form a separator, die cutting said sheet into concentric plates, stacking said plates, heating said stack to plasticize said thermo setting material to bond said plates together, etching all edges of said stack to remove a minute portion of said metallic conductor, and connecting alternate plates to a common bus and the remaining plates to a second bus.

6. In a prime mover, a plurality of dielectric plates, spaced extrusions formed on one face of each plate, a metallic conductor coated on the remaining face of each plate, said plates being stacked in concentric relation and means for supplying potential to said stack whereby the electrostatic action between plates will generate motion and power.

References Cited in the file of this patent

UNITED STATES PATENTS

| | | |
|---|---|---|
| 1,839,130 | Thomas | Dec. 29, 1931 |
| 1,978,200 | Heising | Oct. 23, 1934 |
| 2,398,088 | Ehlers et al. | Apr. 9, 1946 |
| 2,437,212 | Shottland | Mar. 2, 1948 |
| 2,519,810 | Acosta | Aug. 22, 1950 |
| 2,530,533 | Moody | Nov. 21, 1950 |
| 2,661,825 | Winslow | Dec. 8, 1953 |
| 2,662,191 | Okey | Dec. 8, 1953 |
| 2,835,761 | Crownover | May 20, 1958 |